(12) United States Patent
Koch et al.

(10) Patent No.: US 9,820,906 B2
(45) Date of Patent: Nov. 21, 2017

(54) WARMING THERAPY DEVICE

(75) Inventors: Jochim Koch, Ratzeburg (DE); Ulf Timme, Havertown, PA (US)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 1506 days.

(21) Appl. No.: 13/430,921

(22) Filed: Mar. 27, 2012

(65) Prior Publication Data

US 2013/0261709 A1  Oct. 3, 2013

(51) Int. Cl.
*A61G 11/00* (2006.01)
*G05D 23/19* (2006.01)

(52) U.S. Cl.
CPC .......... *A61G 11/00* (2013.01); *G05D 23/1919* (2013.01); *A61G 11/005* (2013.01); *A61G 2203/46* (2013.01)

(58) Field of Classification Search
CPC .... A61G 11/00; A61G 11/003; A61G 11/001; A61G 11/005; A61G 10/02; A61G 2210/90; A61G 2203/46; A61F 7/0053; A61F 7/00; A61F 2007/0088; G05D 23/1919
USPC ...................................................... 600/21, 22
See application file for complete search history.

(56) References Cited

U.S. PATENT DOCUMENTS

| | | | |
|---|---|---|---|
| 6,213,935 B1 | 4/2001 | Mackin et al. | |
| 6,290,643 B1 * | 9/2001 | Falk | A61G 11/00 600/22 |
| 6,296,606 B1 | 10/2001 | Goldberg et al. | |
| 6,506,147 B2 | 1/2003 | Eustace et al. | |
| 6,913,571 B2 | 7/2005 | Severns | |
| 2002/0161276 A1 | 10/2002 | Mountain | |
| 2006/0191905 A1 | 8/2006 | Koch | |
| 2010/0113864 A1 * | 5/2010 | Matsubara et al. | 600/22 |
| 2012/0078034 A1 * | 3/2012 | Falk et al. | 600/22 |

FOREIGN PATENT DOCUMENTS

| | | |
|---|---|---|
| CN | 201959155 U | 9/2011 |
| DE | 20 2005 021 580 U1 | 11/2008 |
| EP | 1 124 403 B1 | 5/2006 |
| WO | 2009/073443 A1 | 6/2009 |

* cited by examiner

*Primary Examiner* — Christine H Matthews
*Assistant Examiner* — Kaylee Wilson
(74) *Attorney, Agent, or Firm* — McGlew and Tuttle, P.C.

(57) ABSTRACT

A heat therapy device including a care unit presenting a lying surface for supporting an infant, a hood which is moveable between a closed position covering the care unit and an opened position clearing the top of the care unit, a radiation heater arranged to irradiate the lying surface in the opened position of the hood, a convection heater, and control units which are configured and arranged to control the operation of the radiation and convection heaters, wherein the control units are configured and arranged to control the operation of the convection heater as a primary heater when the hood is in the closed position and to control the operation of the radiation heater as the primary heater when the hood is in the opened position.

18 Claims, 6 Drawing Sheets

WARMING THERAPY DEVICE

FIELD OF THE INVENTION

The invention relates to a heat therapy device comprising a care unit having a lying surface for supporting an infant, a hood which is moveable between a closed position covering the care unit and an opened position clearing the top of the care unit, a radiation heating arranged such that it can irradiate the lying surface in the opened position of the hood, a convection heating, and control units which are configured and arranged to control the operation of the radiation and convection heatings, wherein the control units are configured and arranged to control the operation of the convection heating as a primary heating when the hood is in the closed position and to control the operation of the radiation heating as the primary heating when the hood is in the opened position.

BACKGROUND OF THE INVENTION

A heat therapy device of this kind is known from DE 20 2005 021 580 U1. The heat therapy device comprises a care unit having a lying surface for supporting an infant. Furthermore, a hood is provided which is moveable between a closed position covering the care unit and an opened position clearing the top of the care unit. Furthermore, a radiation heating is provided which can irradiate the lying surface of the care unit in the opened position of the hood. In addition, a convection heating is provided which serves to maintain the temperature within the care unit at a desired level when the hood is in the closed position. The operation of the radiation heating and the convection heating is controlled by control units. The control units are arranged such that the convection heating is controlled as a primary heating when the hood is closed and that the operation of the radiation heating is controlled as primary heating when the hood is in the opened position. In addition it is mentioned that the radiation heating may be heated up before the beginning of an opening step of the hood, in order to reach the desired temperature faster after the hood is opened. From U.S. 2002/0161276 A1 a heat therapy device is known which is arranged to pre-heat the convection heating before the hood is closed.

Such heat therapy devices are also referred to as "hybrids" which can operate as an incubator in the closed position of the hood and can be operated in the opened position of the hood for open therapy care.

Analytical investigations of the heat balance of an infant during the transition from the closed care to the open care mode or vice versa show that the infant cools off during opening of the hood because the air temperature and the air humidity are decreasing rapidly and because the warm, protecting walls of the hood are removed.

EP 1 124 403 B1 describes a heat therapy device. If the hood is in the closed position (incubator operation) the radiation heating is automatically switched off. Conversely, the convection heating is automatically switched off when the hood is lifted up. Furthermore, the radiation heating is, when it is initially switched on, operated with increased power for a given heating-up period, which increased power is larger than 100% of the nominal power of the lamp. This is disadvantageous because this reduces the lifetime of the radiation heating.

SUMMARY OF THE INVENTION

It is an object of the present invention to adapt a heat therapy device of the above described type in such a manner that the cooling off of the infant during transition from opened to closed care mode and vice versa is minimized.

This object is solved by a heat therapy device according to the present invention.

According to the invention the control units are arranged such that, when the hood is closed, the radiation heating (heater) is operated in a standby mode, and that, when the hood is opened, the convection heating (heater) is operated in a standby mode. In this manner the operating temperature and a sufficient heating output is obtained very quickly by switching over between convection heating and radiation heating as the primary heating. In order to further accelerate a quick transition from convection heating to radiation heating or vice versa from the radiation heating to the convection heating, the control units are configured and adapted according to the invention such that with the beginning of the opening of the hood the radiation heating is operated at a given maximum heating output for a given heating-up period and such that after expiration of the heating-up period, a transition is made to the controlled operation of the radiation heating. Conversely the control units cause, after the beginning of the closing of the hood, that the convection heating is operated for a predetermined heating-up period at a given maximum convection heating output, and that after expiration of the heating-up period it is changed over to the controlled operation of the convection heating as the primary heating.

In any case the maximum radiation heating output and the maximum convection heating output do not exceed the maximum nominal heating output but are lower than or equal to the respective nominal output of the heatings.

In this manner the primary heating (radiation heating in the opened care mode and convection heating in the closed care mode) is brought to the desired heating output very quickly, wherein after this increased heating-up period or boost period the primary heating is caused to transit to an operation with a closed control loop in which the primary heating is controlled according to the desired temperature. With the heat therapy device according to the invention it is possible to keep the temperature change below ±0.5° C. upon changing the care mode. Thus, cooling down of a newborn baby is reduced compared to heat therapy devices of the prior art.

In a preferred embodiment the control units are configured and adapted to operate the radiation heating for a hood heating-up period which is shorter than the heating-up period of the convection heating, at an increased hood heating output in order to quickly raise the temperature of the hood, and to reduce the power input for the radiation heating after expiration of the hood heating-up period, and to operate the convection heating for the remaining heating-up period at a predetermined maximum convection heating output. In this manner the cooled-down hood is heated up while it is closed so that, when the hood reaches the closed position, it is already heated up. The hood heating-up period can be the same as the time period needed for closing the hood or may be longer.

In a preferred embodiment the control units are configured and adapted to reduce the power input to the convection heating during the heating-up period of the radiation heating such that the sum of the radiation heating output and the convection heating output does not exceed a predetermined threshold.

In a further preferred embodiment the control units are configured and adapted to reduce the power supply for the radiation heating during the heating-up period of the convection heating such that the sum of convection heating output and radiation heating output does not exceed a predetermined threshold.

In a preferred embodiment the convection heating is provided with a fan for distributing the heated air, wherein the control units are configured and adapted to reduce the power input to the fan during the heating-up period of the radiation heating.

When the control units are described in the present specification as "configured and adapted" to perform certain heating strategies this includes an adaption by programming or by provision of hard-wired control circuits or combinations of the options mentioned.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
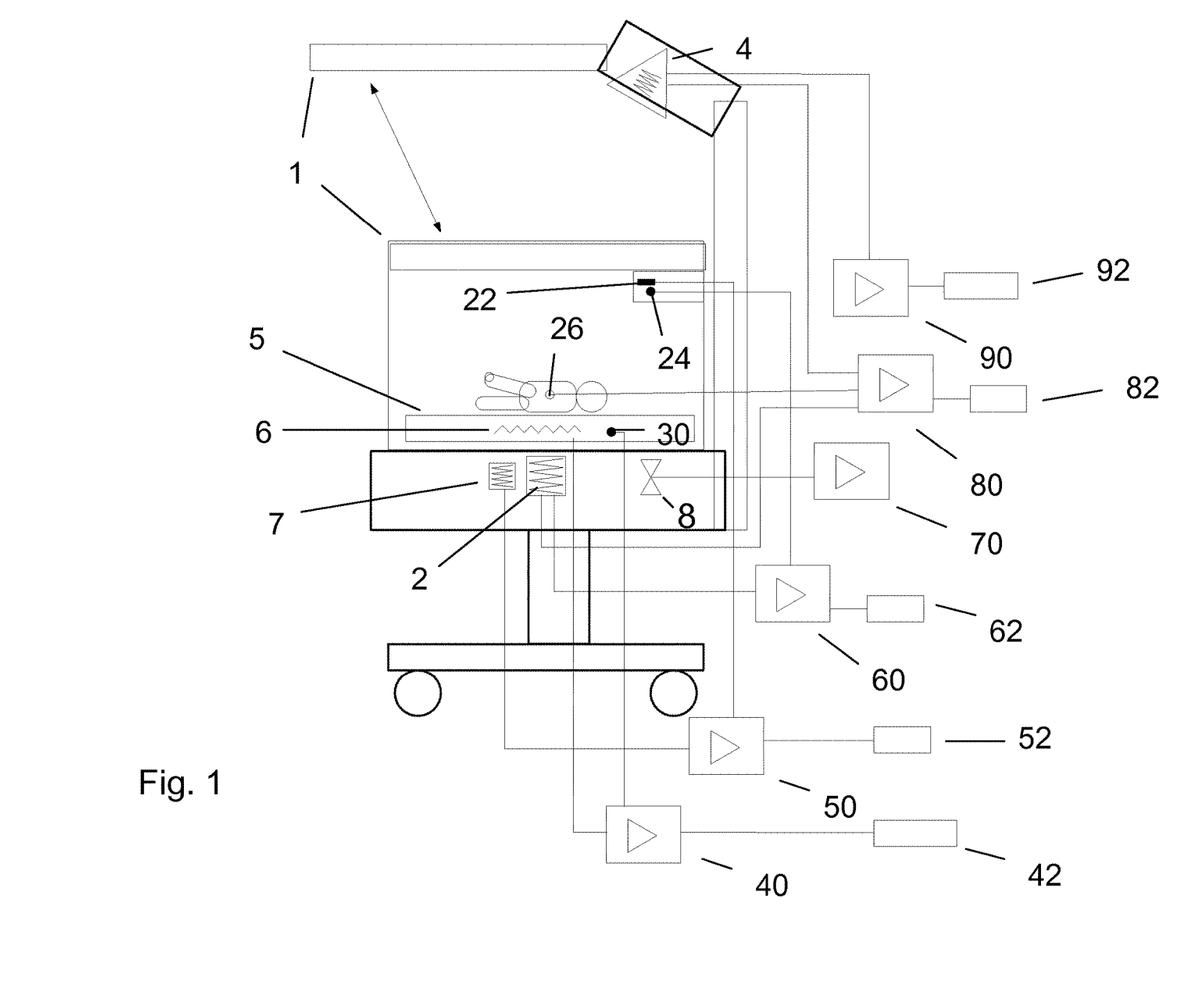
FIG. 1 is a schematic block diagram of a heating therapy device.

The heating therapy device as shown in FIG. 1 has a mattress 5 which presents a lying surface and which is surrounded by side walls. The upper opening between the side walls may be closed by a hood 1 which is shown in FIG. 1 both in the closed position as well as in the opened position and with an intermediate double arrow which indicates the transition from incubator operation to open care and vice versa.

When the hood is closed the convection heating (heater) 2 forms the primary heating source. The convection heating 2 is controlled by an air temperature controller 60. An air temperature input unit 62 and an air temperature sensor 24 are connected to the air temperature controller 60. When the hood 1 is closed the air temperature controller 60 controls the air temperature under the hood to the input desired air temperature value.

Furthermore, there is a radiation heating (heater) 4 which is mounted on a central column above the lying surface of the mattress 5. The operation of the radiation heating 4 is controlled by skin temperature controller 80. A skin temperature input unit 82 and a temperature-sensor 26 are connected to the skin temperature controller 80. When the hood is in the opened position the skin temperature controller 80 controls the radiation heating 4 such that the desired temperature is maintained.

In the mattress 5 there is in addition a mattress heating 6 which is controlled by a mattress temperature controller 40. A mattress temperature input unit 42 and a mattress temperature sensor 30 are connected to the mattress temperature controller 40.

In addition a humidifier 7 is provided which is controlled by a humidity controller 50. A humidity input unit 52 and a humidity sensor 22 are connected to the humidity controller 50.

A skin temperature controller 80 is connected to the convection heating 2 and the radiation heating 4, which skin temperature controller 80 coordinates the operation of the two heatings and into which a measuring value of the skin temperature sensor 26 as well as an input from the skin temperature input unit 82 are supplied.

Furthermore, a fan 8 belongs to the convection heating which is controlled by the venting controller 70.

The control units are configured and adapted in the manner described in the following to control the operation of the heatings during the transition from incubator operation (closed hood) to open care and vice versa.

Figure 2:
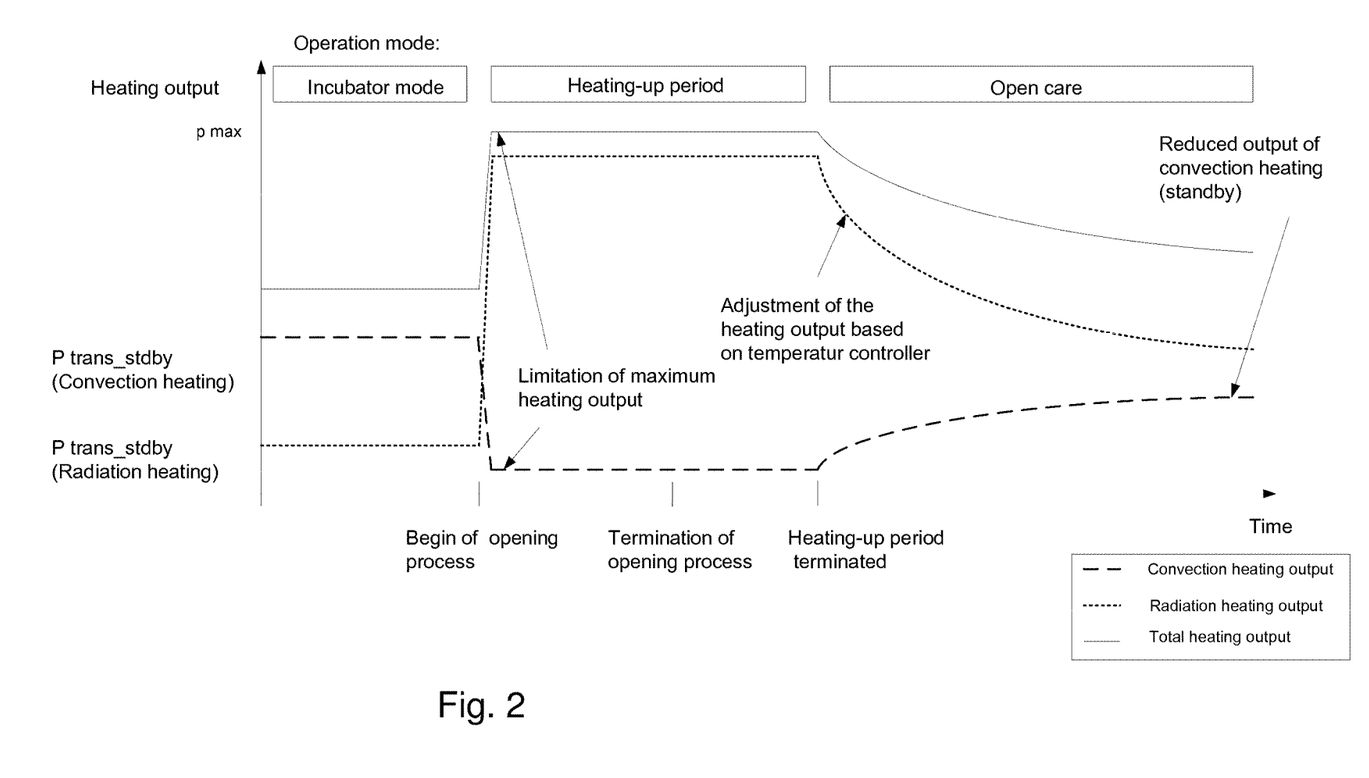
FIG. 2 is a graphic view showing the heating outputs as a function of time during the transition from incubator operation with closed hood to open care with opened hood.

FIG. 2 shows the control of the heating output first in the incubator mode, then after opening of the hood 1 during a heating-up period and a subsequent phase of open care in which the heating output of the radiation heating 4 is controlled. According to the invention the radiation heating 4 is not switched off during incubator operation (closed hood), but is operated with a low predetermined heating output in a standby mode. During the incubator operation the output of the convection heating 2 is constant and indicated by the dashed line. Then a transition is to be performed from incubator operation to open care operation. For this purpose the hood 1 is moved away from its closed position over the lying surface so that the radiation cone of the radiation heating 4 is directed to the mattress 5 and is not obstructed by the hood. As shown in FIG. 2, at the beginning of the opening operation of the hood 1 the radiation heating 4 is operated during a predetermined maximum heating-up period at a predetermined maximum radiation heating output. In this heating-up period the power supply to the convection heating 2 is reduced such that the sum of the reduced convection heating output and the maximum radiation heating output does not exceed a predetermined maximum total power $P_{max}$. The heating-up period lasts longer than the opening operation of the hood 1. After the heating-up period the radiation heating 4 is controlled by skin temperature controller 80. During this period the radiation heating output slowly decreases and approaches a permanent operation value. At the same time the heating output of the convection heating 2 slowly increases to the level of the standby mode.

Figure 3:
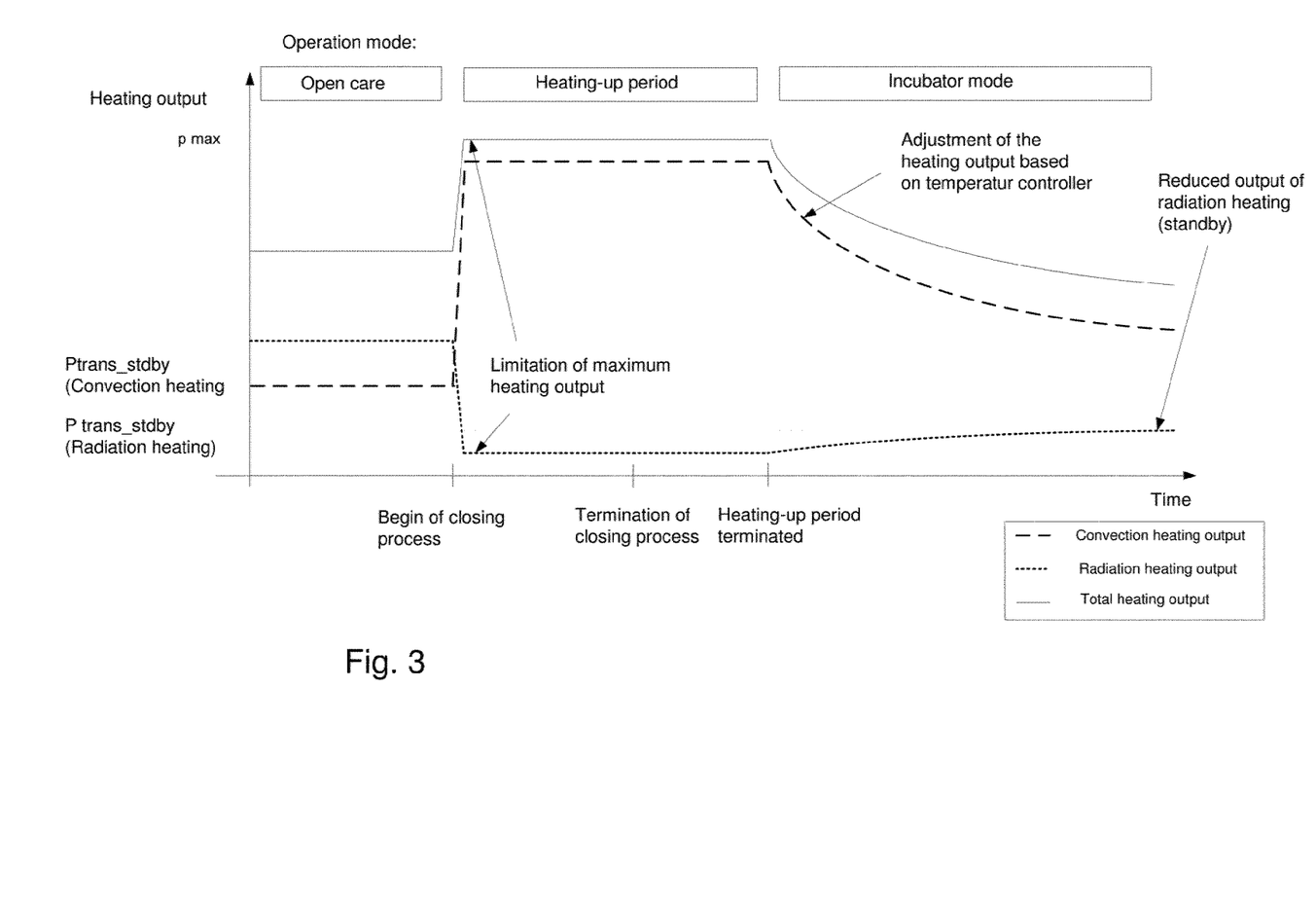
FIG. 3 is a graphic view showing the heating output as a function of time during the transition from open care of the heating therapy device to incubator operation with closed hood.

FIG. 3 illustrates the control of the heating output first in an open care phase in which the convection heating is operated at a low level in a standby mode, while the primary heating output is provided by the radiation heating 4. During the transition to the incubator operation the hood 1 is brought into the closed position. At the same time, with the beginning of the closing movement of the hood, the convection heating is operated for a predetermined heating-up period with a predetermined maximum convection heating output, wherein in this example the heating-up period is somewhat longer than the time span for closing the hood.

While the convection heating is operated at a maximum convection heating output the radiation heating is operated with reduced power such that the total heating output provided by the convection heating and the radiation heating does not exceed a predetermined value $P_{max}$. After the end of the heating-up period the controller brings the convection heating again to a controlled operation in which the output of the convection heating is controlled by skin temperature controller 80. Thereafter the heating output of the convection heating slowly decreases to an end value by the control of the heating output, while the heating output of the radiation heating 4 slowly increases to a predetermined value for the standby mode.

In the illustrated embodiment the heating output of the radiation heating 4 may also be controlled by a radiation heating controller 90 having a heating output input 92. Likewise, the air temperature may be set via an air temperature input 62 to an air temperature controller 60 in order to control the convection heating based thereon alone.

Figure 4:
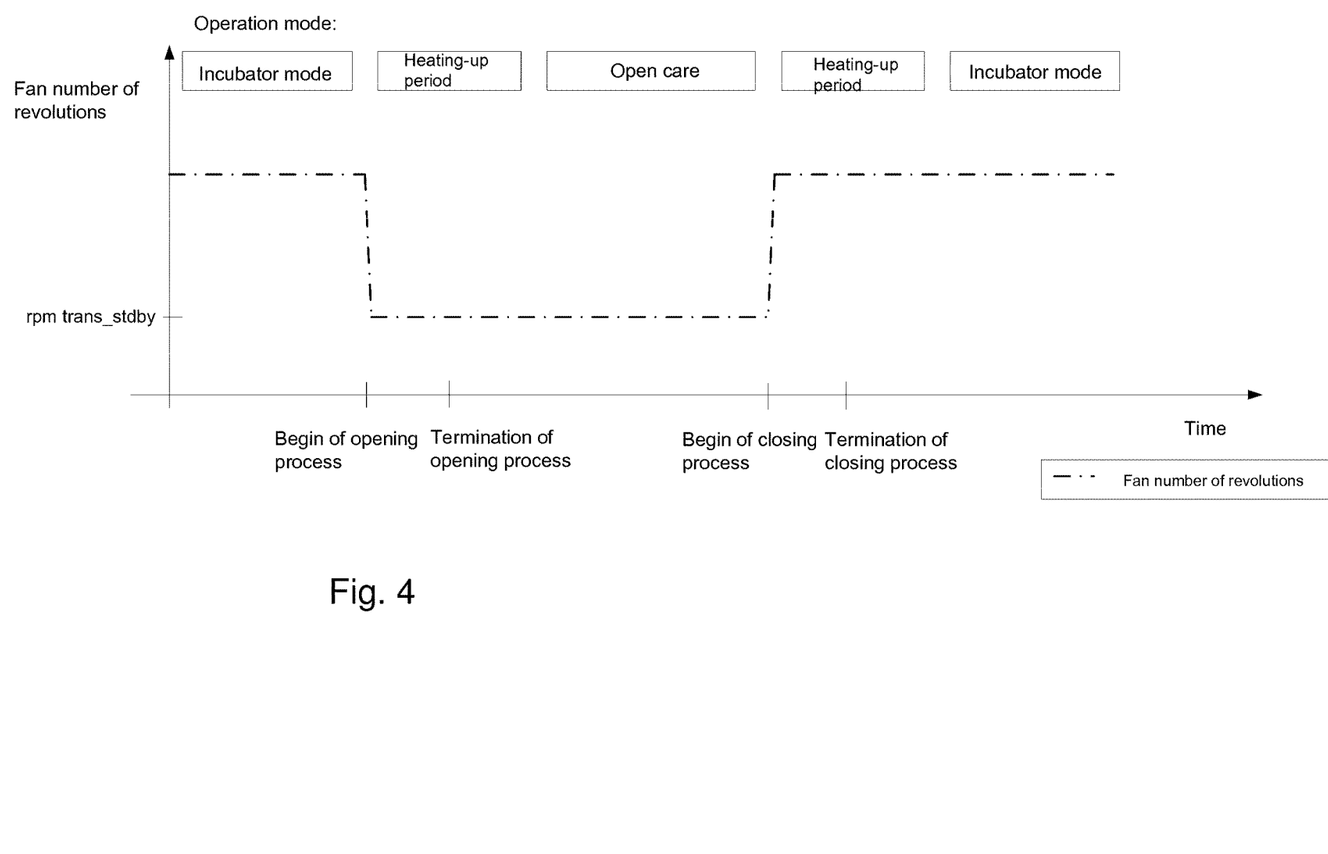
FIG. 4 is a graphic view showing the number of revolutions of the fan as a function of time during the transition between incubator operation to open care and back to the incubator operation.

The heat therapy device is further configured and adapted to reduce the number of revolutions of the fan while transitioning from incubator mode to open care mode to a predetermined standby mode value which is designated as $RPM_{trans\text{-}STDBY}$ in FIG. 4. After termination of the open care phase the convection heating again undergoes the transition to a heating-up period with maximum heating output, wherein at the same time the number of revolutions of the fan is increased to the operation value, as shown in FIG. 4.

Figure 5:
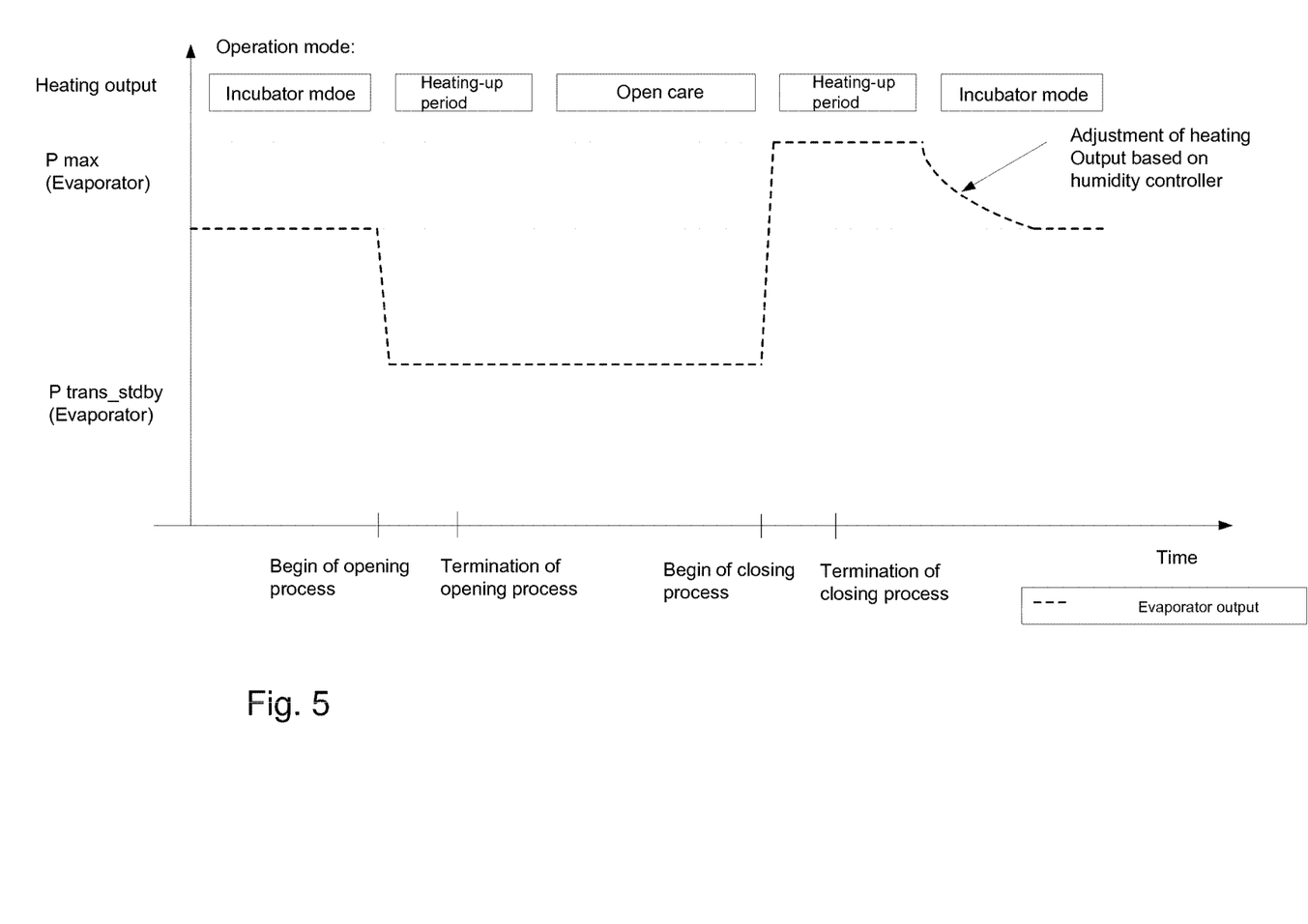
FIG. 5 is a graphic view showing the heating output of the evaporator as a function of time during the transition from incubator operation to open care and back to incubator operation.

The heat therapy device is further adapted to decrease the heating output of an evaporator 7 for providing the desired air humidity to a standby level. At the beginning of the closing operation of the hood during the transition to the incubator operation the evaporator 7 is then operated for a predetermined time span at a maximum heating output value in order to bring the provided humidity to the desired value as fast as possible. After the predetermined time span with the maximum heating output of the evaporator the humidity controller 50 takes over control of the evaporator 7, wherein the desired humidity is input to humidity input 52. This operation mode of the evaporator during the transition from incubator operation to open care mode and vice versa is illustrated in FIG. 5.

Figure 3A:
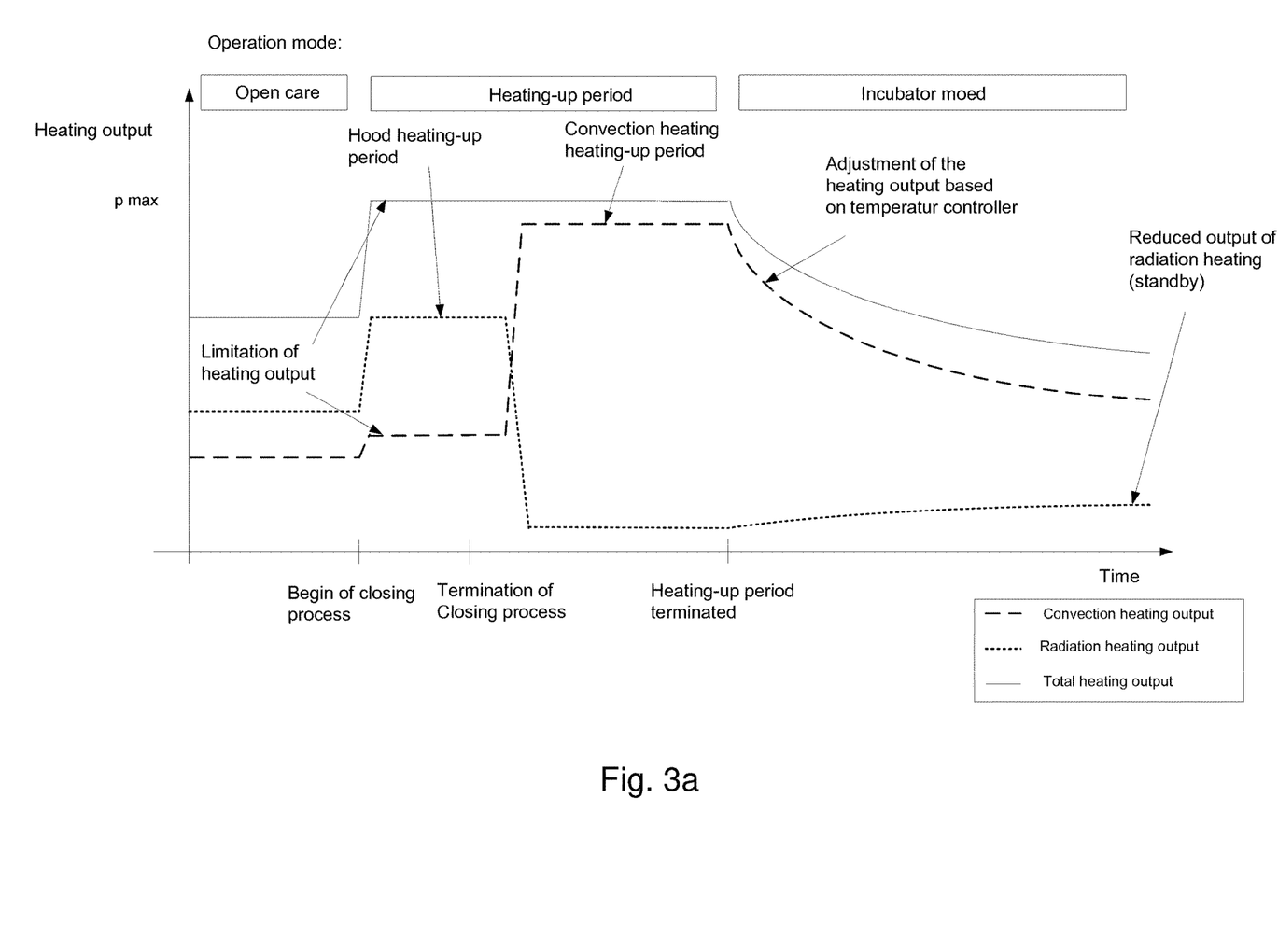
FIG. 3a is a graphic view showing the heating output as a function of time as in FIG. 3 for an alternative embodiment.

In FIG. 3a an alternative embodiment of the heating outputs as a function of time for a heat therapy device is shown during the transition from open care mode to incubator operation. In contrast to the embodiment of FIG. 3 here the convection heating is brought to the maximum convection heating output only after expiration of a hood heating-up period, wherein during the hood heating-up period, which begins with the begin of the closing operation of the hood, the radiation heating is operated with increased heating output in order to directly heat up the hood during the transition to the incubator operation. The hood heating-up period is in the illustrated embodiment longer than the time span needed for the closing operation of the hood. During the hood heating-up period the convection heating is adjusted to a slightly decreased value compared to the standby mode such that the total heating power from the radiation heating and the convection heating does not exceed the maximum heating output.

While specific embodiments of the invention have been shown and described in detail to illustrate the application of the principles of the invention, it will be understood that the invention may be embodied otherwise without departing from such principles.

REFERENCES NUMERALS

1. Hood
2. Convection heating
4. Radiation heating
5. Mattress
6. Mattress heating
7. Humidifier
8. Fan
22. Humidity sensor
24. Air temperature sensor
26. Temperature sensor
30. Mattress temperature sensor
40. Mattress temperature controller
42. Mattress temperature input unit
50. Humidity controller
52. Humidity input unit
60. Air temperature controller
62. Air temperature input
80. Skin temperature controller
82. Skin temperature input unit
90. Radiation heating controller
92. Heating output input

What is claimed is:

1. A heat therapy device comprising:
a care unit comprising a lying surface for supporting an infant;
a hood moveable between a closed position covering the care unit and an opened position clearing a top of the care unit;
a radiation heater arranged for irradiating the lying surface in the opened position of the hood;
a convection heater; and
a control device which is configured and arranged to control said radiation heater and said convection heater, wherein the control device is configured and arranged to control operation of said convection heater as a primary heater when the hood is in the closed position and to control operation of the radiation heater as the primary heater when the hood is in the opened position, said control device being further configured and arranged:
to operate the radiation heater in a standby mode when the hood is in the closed position and to operate the convection heater in a standby mode when the hood is in the opened position;
when the hood begins to open, to operate the radiation heater for a predetermined heating-up period at a predetermined maximum radiation heating output, and after expiration of the heating-up period, to change over to a controlled operation of the radiation heater;
after beginning closing the hood, to operate the convection heater for a predetermined heating-up period at an increased convection heating output, and after expiration of the heating-up period, to change over to a controlled operation of the convection heater; and
after beginning closing the hood, to operate the radiation heater for a hood heating-up period, which is a first portion of the predetermined heating-up period of the convection heater, at an increased hood heating output in order to raise a temperature of the hood, and to reduce a power input for the radiation heater after expiration of the hood heating-up period, and to operate the convection heater for a remaining portion of the predetermined heating-up period of the convection heater at a predetermined maximum convection heating output, wherein the first portion of the predetermined heating-up period of the convection heater is shorter than the remaining portion of the predetermined heating-up period of the convection heater.

2. A heat therapy device according to claim 1, wherein the control device comprises one or more control units.

3. A heat therapy device according to claim 2, wherein the one or more control units are further configured and arranged to reduce a power supply for the radiation heater during the heating-up period of the convection heater such that a sum of convection heating output and radiation heating output does not exceed a predetermined threshold.

4. A heat therapy device according to claim 2, wherein the one or more control units are further configured and arranged to reduce power input to the convection heater during the heating-up period of the radiation heater such that a sum of the radiation heating output and the convection heating output does not exceed a predetermined threshold.

5. A heat therapy device according to claim 1, wherein the control device comprises a plurality of control units, said control units being further configured and arranged to reduce a power input to the convection heater during the heating-up period of the radiation heater such that a sum of the radiation heating output and the convection heating output does not exceed a predetermined threshold.

6. A heat therapy device according to claim 5, wherein the control units are further configured and arranged to reduce a power supply for the radiation heater during the heating-up period of the convection heater such that a sum of convection heating output and radiation heating output does not exceed a predetermined threshold.

7. A heat therapy device according to claim 1, wherein the control device comprises control units, the convection heater being provided with a fan for distributing heated-up air, and the control units being configured and arranged to reduce a power input to the fan during the heating-up period of the radiation heater.

8. A heat therapy device according to claim 1, wherein said radiation heater provides a radiation heater standby heating output in said standby mode when the hood is closed, said convection heater providing a convection heater standby heating output in said standby mode when the hood is in the opened position, said radiation heater standby heating output being less than said predetermined maximum radiation heating output, said convection heater standby heating output being less than said increased convection heating output.

9. A heat therapy device comprising:
a care unit comprising a lying surface for supporting an infant;
a hood moveable between a closed position covering the care unit and an opened position;
a radiation heater arranged for irradiating the lying surface in the opened position of the hood;
a convection heater;
a control system configured and arranged to:
control operation of the radiation heater as the primary heater when the hood is in the opened position;
operate the radiation heater in a radiation heater standby mode when the hood is closed, wherein said care unit is at least partially heated via at least said radiation heater in said standby mode when the hood is in the closed position;
operate the radiation heater for a predetermined heating-up period at a predetermined maximum radiation heating output when the hood begins to open;
change over to a controlled operation of the radiation heater after expiration of the heating-up period;
control operation of said convection heater as a primary heater when the hood is in the closed position;
operate the convection heater in a standby mode when the hood is in the opened position, wherein said care unit is at least partially heated via at least said convection heater in said standby mode of said convection heater when the hood is in the opened position;
operate the convection heater for a predetermined heating-up period at an increased convection heating output after beginning a closing operation of the hood;
change over to a controlled operation of the convection heater after expiration of the heating-up period; and
after beginning the closing operation of the hood, to operate the radiation heater for a hood heating-up period, which is a first portion of the predetermined heating-up period of the convection heater, at an increased hood heating output in order to raise a temperature of the hood, and to reduce a power input for the radiation heater after expiration of the hood heating-up period, and to operate the convection heater for a remaining portion of the predetermined heating-up period of the convection heater at a predetermined maximum convection heating output, wherein the first portion of the predetermined heating-up period of the convection heater is shorter than the remaining portion of the predetermined heating-up period of the convection heater.

10. A heat therapy device according to claim 9, wherein said hood clears a top of the care unit in said opened position, wherein said hood is located at a spaced location from a radiation output path of said radiation heater with said hood in said opened position.

11. A heat therapy device according to claim 9, wherein said control system comprises a radiation heater control unit and a convection heater control unit, said radiation heater control unit being configured and arranged to perform:
the controlled operation of the radiation heater as the primary heater when the hood is in the opened position;
the operation of the radiation heater in the radiation heater standby mode when the hood is in the closed position;
the operation of the radiation heater for the predetermined heating-up period at the predetermined maximum radiation heating output when the hood begins to open; and
the changing over to the controlled operation of the radiation heater after expiration of the heating-up period;
said convection heater control unit being configured and arranged to perform:
the controlled operation of said convection heater as a primary heater when the hood is in the closed position;
the operation of the convection heater in the standby mode when the hood is in the opened position;
the operation of the convection heater for the predetermined heating-up period at an increased convection heating output after beginning the closing operation of the hood; and
the changing over to the controlled operation of the convection heater after expiration of the heating-up period.

12. A heat therapy device according to claim 11, wherein said radiation heater provides a radiation heater standby heating output in said standby mode when the hood is in the closed position, said convection heater providing a convection heater standby heating output in said standby mode when the hood is in the opened position, said radiation heater standby heating output being less than said predetermined maximum radiation heating output, said convection heater standby heating output being less than said increased convection heating output.

13. A heat therapy device according to claim 11, wherein the radiation heater control unit and the convection heater control unit are further configured and arranged to reduce a power input to the convection heater during the heating-up period of the radiation heater such that a sum of the radiation heating output and the convection heating output does not exceed a predetermined threshold.

14. A heat therapy device according to claim 13, wherein the radiation heater control unit and the convection heater control unit are further configured and arranged to reduce a power supply for the radiation heater during the heating-up period of the convection heater such that a sum of convection heating output and radiation heating output does not exceed a predetermined threshold.

15. A heat therapy device according to claim 11, wherein the radiation heater control unit and the convection heater control unit are further configured and arranged to reduce a power supply for the radiation heater during the heating-up period of the convection heater such that a sum of convection heating output and radiation heating output does not exceed a predetermined threshold.

16. A heat therapy device according to claim 11, wherein the convection heater is provide with a fan for distributing heated-up air, and the radiation heater control unit and the convection heater control unit are further configured and arranged to reduce a power input to the fan during the heating-up period of the radiation heater.

17. A heat therapy device comprising:
a care unit comprising a lying surface for supporting an infant;
a hood moveable between a closed position covering the care unit and an opened position;
a radiation heater arranged for irradiating the lying surface in the opened position of the hood;
a convection heater;
a control system configured and arranged to:
control operation of the radiation heater as the primary heater when the hood is in the opened position;
operate the radiation heater in a radiation heater standby mode when the hood is in the closed position, wherein said radiation heater provides a radiation heater heat output in said radiation heater standby mode when the hood is in the closed position;
operate the radiation heater for a predetermined heating-up period, which is a longer period of time than an opening operation period of the hood, at a predetermined maximum radiation heating output when the hood begins to open;
change over to a controlled operation of the radiation heater after expiration of the heating-up period;
control operation of said convection heater as a primary heater when the hood is in the closed position;
operate the convection heater in a convection heater standby mode when the hood is in the opened position, wherein said convection heater provides a convection heater heat output in said convection standby mode when the hood is in the opened position;
operate the convection heater for a predetermined heating-up period, which is a longer period of time than a closing operation period of the hood, at an increased convection heating output after beginning the closing operation of the hood; and
change over to a controlled operation of the convection heater after expiration of the heating-up period.

18. A heat therapy device according to claim 17, wherein said hood clears a top of the care unit in said opened position, wherein said hood is located at a spaced location from a radiation output path of said radiation heater with said hood in said opened position, said radiation heater heat output being less than said predetermined maximum radiation heating output, said convection heater heat output being less than said increased convection heating output, said control system comprising a radiation heater control unit and a convection heater control unit, said radiation heater control unit being configured and arranged to perform:
the controlled operation of the radiation heater as the primary heater when the hood is in the opened position;
the operation of the radiation heater in the radiation heater standby mode when the hood is in the closed position;
the operation of the radiation heater for the predetermined heating-up period at the predetermined maximum radiation heating output when the hood begins to open; and
the changing over to the controlled operation of the radiation heater after expiration of the heating-up period;
said convection heater control unit being configured and arranged to perform:
the controlled operation of said convection heater as a primary heater when the hood is in the closed position;
the operation of the convection heater in the convection heater standby mode when the hood is in the opened position;
the operation of the convection heater for the predetermined heating-up period at the increased convection heating output after beginning the closing operation of the hood; and
the changing over to the controlled operation of the convection heater after expiration of the heating-up period.

* * * * *